Patented Feb. 20, 1934

1,948,422

UNITED STATES PATENT OFFICE 1,948,422

COMPOSITION FOR RECONDITIONING WOOD, ABRASED SPIKE HOLES IN RAIL SLEEPERS, OR FOR FILLING OTHER HOLES AND FOR SIMILAR PURPOSES

Sri Krishna, Dehra Dun, United Provinces, British India

No Drawing. Application September 7, 1932, Serial No. 631,996, and in India September 7, 1931

4 Claims. (Cl. 106—8)

This invention has reference to compositions of the kind comprising asphaltic or bituminous substances; resinous material as caoutchouc, waste rubber or synthetic resinates, and rosin or rosinates, rendered fit by sulphurization and vulcanization, for use in very hot or very cold climates. This invention also relates to a process of making the compound which is primarily adapted to be used for reconditioning abrased spike holes in railway sleepers, but which is also useful for filling cracks in concrete roofs, etc.

According to this invention the composition when melted is capable of being poured into holes or cracks in wood for which it has a strong bonding property; the composition to this end being constituted by mixing and heating together suitable proportions of asphalt (natural or prepared) or bitumen; and caoutchouc or waste rubber or synthetic resinates in suitable solvent media such as castor oil, linseed oil or other organic solvents; and rosins such as colophony, sulphurizing and vulcanizing the mixture to proper consistency and hardness. The solid mass thus obtained is suitable for use in filling cavities in wood which may have been caused by natural decay, by wear and tear, or by other causes. The composition is also capable of bonding together pieces of metals with wood and is suitable for use in fixing metal spikes or wooden plugs in holes in wood or concrete, thus obviating the necessity of boring fresh holes in previously used timber, the composition serving as a filling, binding and preserving agent.

This invention includes a composition of matter for the purposes explained in which asphalt is mixed with resinous materials and then vulcanized. The said composition is solid at ordinary temperature and melts on heating and thus is capable of being poured, but will set hard on cooling and will remain hard at such high temperature as 200° F.

This invention includes also the manner of compounding and applying a composition of matter, which consists in mixing and heating and vulcanizing the ingredients referred to in proportions which will set solid when cool and can be rendered plastic or liquid by suitable increase in temperature.

The use of rubber in addition to various bituminous substances for preparation of compositions similar to the above is well known. In accordance with a known process a 5–10 per cent solution is prepared of caoutchouc in benzene, petrol or carbon tetrachlorethane ($CHCl_2$–$CHCl_2$) and the said solution being mixed with bitumen and the mixture thus obtained is used for variety of purposes. In another case coal tar, anthracene, bitumen, petroleum residue and rubber have been used after partial or complete vulcanization. Yet in another process a fatty oil has been hardened by heating with metallic oxides and the rubber like product thus formed has been incorporated in bitumen. It is also known that rosin has been used in preparation of said compositions, and sulphur with the intention of hardening or vulcanizing the compositions. But in none of the above processes have the use of asphalt, rubber, fatty oils, rosin, sulphur and vulcanization been made in the manner to be detailed later. And all the inventions quoted above relate to processes of making compositions which are primarily adopted to be used as road paving materials.

This invention consists of a process of mixing, heating together, sulphurizing and vulcanizing with sulphur suitable proportions of asphalt or bitumen, rubber dissolved in castor oil; and colophony, at suitable temperature.

The proportion by weight of the ingredients is preferably as follows:—

|  | Parts |
|---|---|
| Asphalt (natural, mpt. 90°–103° C.) | 50–57 |
| Rosin (colophony, commercial) | 7–12 |
| Rubber (waste rubber) | 15–11 |
| Castor oil (commercial, crude) | 15–11 |
| Sulphur (commercial) | 13–9 |

The above are to be compounded as follows:— 53 parts of asphalt is melted along with 10 parts of rosin and the temperature of the mixture is slowly raised to 240°–250° C. and 5 parts of powdered sulphur is added in small portions at a time; temperature being maintained at 250° C. After each addition of sulphur the mixture froths up considerably and the next portion of the sulphur is added only after the froth has subsided. The whole operation is performed in about 50 minutes. 13 parts of waste rubber, such as old tubes from motor vehicles, dissolved in 13 parts of castor oil and kept hot at 270° C. is then poured in the above vulcanized asphaltic mixture and incorporated by thorough stirring. To this mixture is now added 6 parts of powdered sulphur in small portions as before, temperature being maintained at 260°–270° C.; and the operation taking about an hour. The mixture is then allowed to remain at 270° C. for another 10 minutes before it is poured in blocks to cool. The best results are obtained when the composition has a fusion point of 85°–95° C. (Ball and Ring method).

The asphalt or bitumen serves to give the body; rosin the fluidity and the quick setting property, and resinous materials the necessary tenacity and elasticity. Sulphur is added to vulcanize asphalt, rubber and the oil with the intention of imparting to the mixture the requisite amount of hardness. For application, the blocks can be broken into small lumps, melted to a thin liquid on fire, and poured into the cavities or holes and after allowing it to shrink on slight cooling the spike, wooden plug and the like kept hot in the molten composition, is pushed in by gentle hammering, the composition thus spreading inside into all cracks and crevices and the composition in the set condition gripping and tightly adhereing to both the metal and the wood.

This invention thus comprises a composition of matter admirably suited for reconditioning wooden sleepers and the like purposes, where strong adhesion or an attachment of metal to wood, metal to stone or concrete, wood to wood, or stone to stone is desired. It can, therefore, be used for stopping leaks in concrete or metallic roofs of houses and for like purposes. Also for the purposes of making elastic and preservative cushion for interposing between wooden sleeper and the metal plate on which the rails rest.

From the foregoing it is obvious that the invention is particularly serviceable in reconditioning wooden or concrete sleepers, the reconditioning being found necessary due to natural decay, wear, tear, splitting or due to spike killing. Spikes embedded in the composition referred to will hold tightly comparable to that afforded by the original sleeper substance. The composition is also capable of being used in fixing metal in horn, ivory or wood such as fixing loose knives in their handles or sockets, etc., and also being used as a water tightening material as, for example, stopping holes or cracks in concrete or metallic roofs or buildings, etc.

I claim:—

1. A process of manufacturing a composition of matter for reconditioning wood, abrased spike holes in rail sleepers and for other similar purposes, according to which from 50 to 57 parts of asphalt are first mixed with 7 to 12 parts of rosin at a temperature of 240° to 250° C., secondly, approximately five parts of powdered sulphur are gradually added to this mixture, thirdly, a solution of rubber in a fatty oil, such as castor oil, is added to the sulphurized mixture of asphalt and rosin, and the mixture finally vulcanized by heating with sulphur.

2. A process as claimed in claim 1, characterized in that whilst the powdered sulphur is being added to the mixture of asphalt and rosin the temperature is maintained to approximately 250° C.

3. A process according to claim 1, in which the final vulcanization is secured by adding approximately six parts of sulphur to the mixture which is then heated to a temperature of 260° to 270° C.

4. A vulcanized composition of matter for reconditioning wood, abrased spike holes in rail sleepers and for other similar purposes, comprising the following proportions of materials:—

|  | Parts |
|---|---|
| Asphalt (natural, mpt. 90°–103° C.) | 50–57 |
| Rosin (colophony, commercial) | 7–12 |
| Rubber (waste rubber) | 15–11 |
| Castor oil (commercial, crude) | 15–11 |
| Sulphur (commercial) | 13–9 |

SRI KRISHNA.